REMOTE CONTROL SYSTEM

Filed March 22, 1960

4 Sheets-Sheet 1

INVENTOR.
Erwin M. Roschke
BY Francis W. Crotty
Atty.

May 11, 1965 E. M. ROSCHKE 3,183,444
REMOTE CONTROL SYSTEM
Filed March 22, 1960
4 Sheets-Sheet 2

INVENTOR
Erwin M. Roschke
BY Francis W. Crotty
Atty.

INVENTOR
Erwin M. Roschke
BY Francis W. Crotty
Atty.

INVENTOR.
Erwin M. Roschke
BY [signature]
Atty.

United States Patent Office 3,183,444
Patented May 11, 1965

3,183,444

REMOTE CONTROL SYSTEM

Erwin M. Roschke, Des Plaines, Ill., assignor to Zenith Radio Corporation, a corporation of Delaware Filed Mar. 22, 1960, Ser. No. 16,679
18 Claims. (Cl. 325—392)

The present invention is directed to a remote control system to permit the adjustment of various operating characteristics of a wave-signal receiver from a remote point. While being of general application, it is especially useful for the control of a television receiver and will be described in that specific environment.

In the very recent past, there was introduced commercially a system to permit the remote control of a television receiver characterized by the fact that it was no longer necessary to have a cable connection extending from the controlling point to the receiver; nor was it necessary for the control to be of the radio-frequency type. Predecessor remote controls employing either a cable connection or a radio-frequency transmitter had failed to make their way in the market place and were discarded. The new remote control system, unlike its predecessor arrangements, has enjoyed wide acceptance and is currently in extensive use.

This system has two major components, namely, a transmitter which issues commands to control a receiver and a control chassis to accept and interpret those commands as required to accomplish desired ones of several control functions within the receiver. Certain mechanical features of the transmitter are disclosed and claimed in Patent 2,821,954 issued February 4, 1958, to R. Adler; Patent 2,821,955 issued to R. C. Ehlers et al. on the same day and 2,821,956 likewise issued on the same date to O. E. Wold. They describe the structure of an electromechanical transmitter featuring several longitudinal-mode resonators or vibrators which may be excited to transmit command signals of different supersonic frequencies with a particular function assigned to a particular command signal frequency. A control chassis for accepting and interpreting the command signals, directing them to controlled circuits in accordance with their individual frequency assignments, is described and claimed in Patent 2,817,025 issued to Robert Adler on December 17, 1957. All of these patents are assigned to the same assignee as the present invention.

The arrangement to be described herein is a further development of this same type of remote control system. In accordance with one feature, the subject arrangement, in effect, permits doubling up of functions assigned to one command signal frequency. It permits, as an illustration, the use of a single control frequency to turn the television receiver on and thereafter to effect muting at selected time intervals as desired by the user.

Another feature has to do with achieving continuous adjustments in volume even though the duration of the command signal may be short relative to the interval over which a continuously adjustable volume control must be manipulated to attain the adjustment desired.

In accordance with still another aspect of the invention, the power supply of the control system has reduced requirements so that it becomes practicable to leave the lower supply of the control chassis energized during intervals in which the controlled receiver is itself turned off. Obviously, any power supply arrangement may be constructed for continuous energization but the feature here under consideration accomplishes this desired result in a novel way which reduces both the operating costs and the structure of the power supply of the control chassis itself.

Accordingly, it is a principal object of the invention to provide improvements in remote control systems for wave-signal receivers.

It is a particular object of the invention to provide a remote control system in which a large number of controlled functions may be accomplished with a lesser number of different frequencies or types of command signals.

It is a further object of the invention to effect improvements in particular portions of remote control systems including especially the structure of the power supply of the control chassis and one or more of the control relay circuits which utilizes the transmitted command signals.

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

Figure 1:
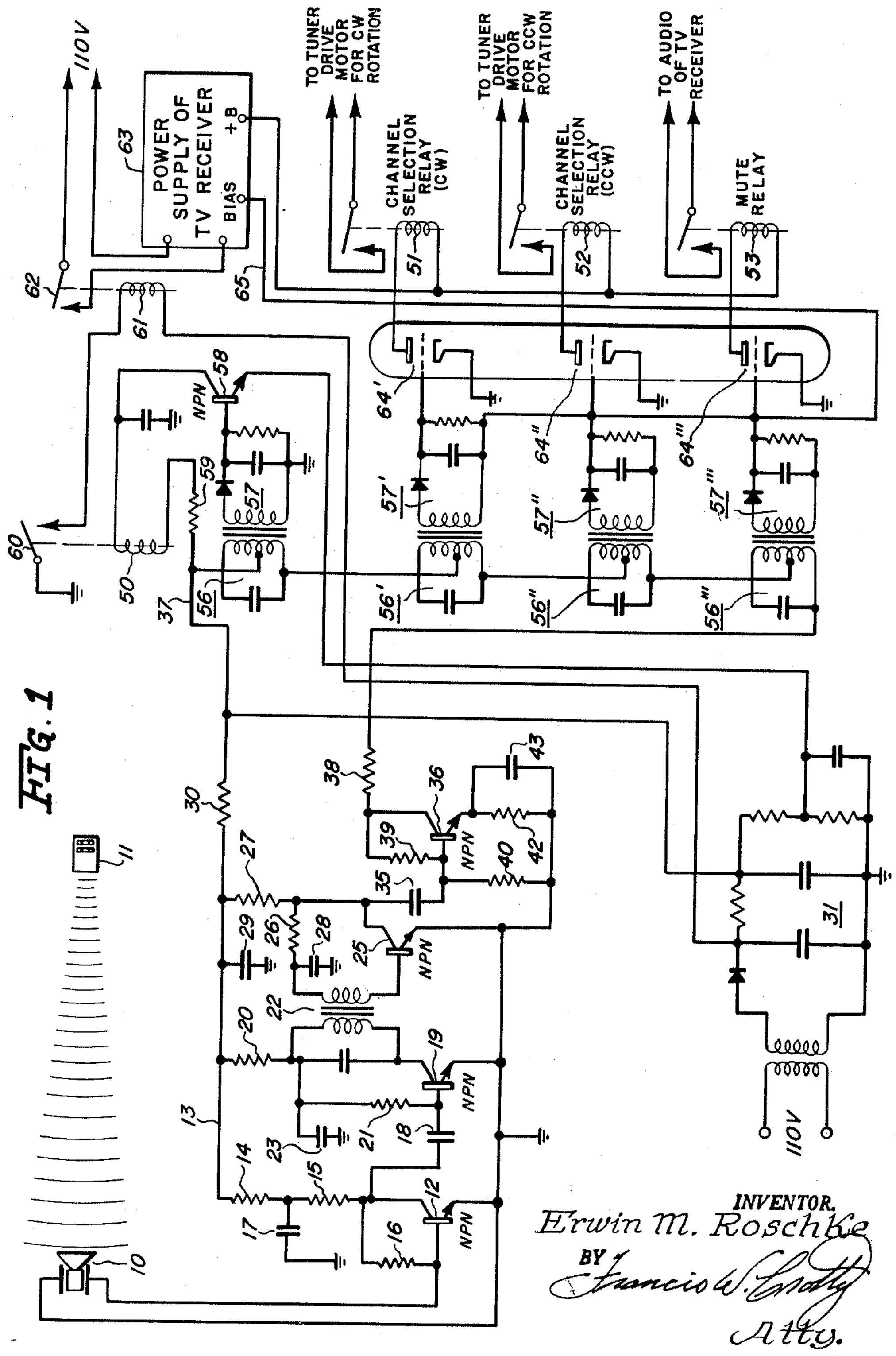
FIGURE 1 is a schematic circuit diagram of a remote control system having the power supply of the control chassis constructed in accordance with the subject invention.

Referring now more particularly to FIGURE 1, the arrangement there represented discloses details of the control chassis but only indicates its connections to the controlled television receiver. This has been done to simplify the drawings and also because the construction of the controlled receiver may be entirely conventional. In the usual installation, taking advantage of the control chassis of FIGURE 1, command signals may turn the receiver on and off by closing its 110 volt A.-C. supply. Obviously, the arrangement of the receiver power supply, per se, is a matter completely within the knowledge of the art. Also, in order to take full advantage of the capabilities of the illustrated control chassis, relays are provided which effect tuning of the receiver by displacing a rotatable tuning element selectively in a clockwise or counter-clockwise direction. This element may be the rotatable turret of the well-known turret-type tuner or it may be the rotor of a band switch or the like. Each is characterized by having a series of preset positions and a driving motor may rotate the tuner to effect channel selection. The structural details of both forms of tuners are thoroughly well understood. The art also understands the design and construction of orienting systems which permit the tuner to skip channel positions which have no significance in a particular installation and to stop the tuner only at other positions which select channels available in the particular community. For these reasons, the tuner of the receiver and its driving arrangement have not been shown. For the same reasons, it has not been deemed necessary to illustrate in detail the muting circuit which, when selectively operated, disables the audio system of the receiver. It permits the viewer to listen to the audio portion of telecasts or not as the viewer himself chooses.

With this word of explanation, it will be understood that the arrangement to be described is a remote control system for a wave-signal receiver which receiver has adjustable elements for varying different operating characteristics thereof such as channel selection, on/off and muting. The receiver has a power supply for providing the usual operating potentials to its various stages. The control system for remotely operating that receiver comprises a signal-translating channel including a transducer 10 for receiving command signals originated at a remote point. The transducer is represented as a capacitive type microphone. In general, it is any device which may receive supersonic command signals and derive in response thereto an electrical signal representing the received command.

Such command signals may originate in a transmitter 11 which is a small mechanical device that may be held in the hand and is freely portable since it has no physical connection to the receiver which it controls. It usually includes a series of longitudinal vibrators corresponding in number to the number of discrete frequency assignments of command signals to be employed in the system. Each vibrator has a pre-assigned length which determines the frequency of the command signal it generates; this facilitates having different frequency assignments for the signals through which they may be recognized and separated from one another in the control chassis and channeled in accordance with the functions assigned to each such frequency.

The signal-translating channel of the remote control chassis further comprises several stages of amplification coupled in cascade to transducer 10 for amplifying received signals. The first stage includes a transistor 12 operated with its emitter grounded and with transducer 10 connected between its base and emitter. Operating potentials or biases are supplied to the transistor from a bus 13 through a network of resistors 14, 15 and 16. The junction of resistors 14 and 15 is bypassed to ground for signal frequencies by a capacitor 17. The collector of this stage is coupled through a capacitor 18 to the base of a transistor 19 in the next stage which is also operated with a grounded emitter. Bus 13 is similarly connected to this transistor through resistors 20, 21 and also through an interstage coupling transformer 22 included in the collector circuit. The junction of resistors 20 and 21 is bypassed to ground for signal frequencies by a capacitor 23 while the interstage transformer is tuned, as indicated, to restrict the acceptance of the control chassis to a narrow band of frequencies which includes the command signals. This affords protection against spurious signals that may otherwise be picked up by microphone 10. The final stage of amplification includes a transistor 25. Its emitter is grounded and its base connects with bus 13 through the secondary winding of transformer 22 and resistors 26, 27. Capacitor 28 is for signal bypassing to ground and capacitor 29 is part of the power supply filter which also includes a series resistor 30 through which bus 13 connects to a power supply 31.

A capacitor 35 couples the collector circuit of amplifier 25 to the base of a transistor 36 which is operated as a symmetrical limiter. Bias potentials are applied to transistor 36 from a bus 37, connected to power supply 31, through the series arrangement of frequency-selective networks to be considered more particularly hereinafter and resistors 38, 39 and 40. The D.C. operating point of transistor 36 is partially stabilized by a resistor 42, through which the emitter is connected to ground, while capacitor 43 serves as an A.C. bypass around resistor 42.

There are a series of control devices or relays effectively coupled in series in the collector circuit of limiter 36 to be actuated by received command signals. These devices take the form of control relays, such as a pilot relay 50 for controlling the on/off condition of the receiver; a control relay 51 for effecting channel selection by clockwise rotation of a tuning element; a control relay 52 for accomplishing channel selection by counter-clockwise rotation of the tuner; and a fourth control relay 53 serving as a mute control. The coupling of each such relay to the amplifier-limiter is through a frequency selective link, there being four such links each having essentially the same construction. The first includes a selector 56 in the form of a circuit which is anti-resonant to the command frequency assigned to operate on/off relay 50. Selector 56 is coupled through a detector circuit 57 and a transistor amplifier 58 to relay 50. The detector circuit is of the usual form, comprising a diode inductively coupled to selector 56 and having a resistance-capacitance load network connected to the base of transistor 58. Bias potentials are applied to transistor 58 from bus 37 through a resistor 59 and the energizing winding of control relay 50, while the emitter is returned to a tap on a voltage divider in power supply 31 so that transistor 58 is biased to its non-conductive condition until a signal which exceeds a minimum threshold value is applied to its base-emitter circuit.

The controlled element or armature 60 of relay 50 is coupled to the power supply of the television receiver selectively to enable or disable the power supply as relay 50 is actuated by command signals. It is convenient to have armature 60 of relay 50 complete the energizing circuit of a further relay 61 which relay is a bi-stable device having an armature 62 to complete or interrupt the 110 volt supply to the power supply 63 of the receiver. This reduces the load on transistor 58.

This coupling link from channel-selection relay 51 is through a selector 56′, a detector 57′ and a triode amplifier 64′. Aside from the resonant frequency of selector 56′, this link is functionally the same as that of pilot relay 50. Its amplifier 64′, however, is of the vacuum tube type and anode potential therefor is derived from the +B terminal of the receiver power supply 63. A bias obtained from that same power supply is delivered by way of a bus 65 normally to maintain amplifier 64′ in its non-conductive condition.

A selector 56″, rectifier 57″ and amplifier 64″ connect channel-selection relay 52 to the amplifier limiter and in like fashion components 56‴, 57‴ and 64‴ make connections from mute relay 53 to the limiter. Triodes 64′, 64″ and 64‴ are enclosed within a single envelope because such a three-section tube is commercially available under type designation 6EZ8. Relays 53 and 61 are of the bi-stable type whereas relays 50, 51 and 52 have armatures which are biased to an open condition but which are displaced to close against a stationary contact for the duration of the actuating signal applied to the relay winding.

The power supply 31 applies operating potentials only to the amplifier-limiter and pilot relay 50 and its coupling link 56, 57. It is of conventional construction comprising a half wave rectifier plus a resistance-capacitance filter energized from an A.C. supply in the usual way.

In considering the operation of the described arrangement, it will be assumed initially that relays 50–53 and 61 are conditioned such that their armatures are not in engagement with their associated stationary contacts to close the circuits that they control. For this condition, the 110 volt supply to the television receiver is interrupted at armature 62, channel selection is not taking place and the audio system is not muted. To operate the receiver, hand transmitter 11 is operated to issue a command signal of the frequency to which selector 56 is tuned. This signal is picked up by mircophone 10 and is amplified and limited in stages 12, 19, 25 and 36 and delivered to selector 56. After detection by detector 57 and further amplification in amplifier 58, it causes pilot relay 50 to operate, displacing its armature 60 to complete an energizing circuit for control relay 61. This relay likewise attracts its armature 62 and energizes or enables the power supply of the controlled receiver.

At this juncture, operating potentials are supplied to the various stages of the receiver and also to amplifiers 64′, 64″ and 64‴ which previously had been de-energized. The control chassis and all of the primary control relays 51–53 are now in condition to respond to received command signals and accomplish the various functions of channel selection and muting in the receiver. The selection of a particular function is, of course, accomplished by reason of the fact that the command signals have particularly assigned frequencies which correspond to the resonant frequencies of the selectors through which the primary control relays are selectively energized.

By way of example, if it is desired to mute the receiver, transmitter 11 is actuated to issue a command signal having a frequency harmonically related to that of selector 56'''. That signal causes energization of mute relay 53 which is actuated to mute the receiver. The muted condition continues until the next succeeding pulse or command of the same frequency is received at which time relay 53 is again actuated and the mute is removed. Channel selection is accomplished when a command signal actuates relay 51 or 52. Actuation of either relay rotates the tuner to the next channel position that is effective for the specific receiver location.

It is apparent that the requirements of chassis power supply 31 for the described arrangement are substantially reduced over prior arrangements in that power supply 31 does not provide the power for any of the control relays other than pilot relay 50 and on/off relay 61. Power for the other primary relays 51–53, inclusive, is derived from the receiver power supply 63 and then only when required, that is to say, only after the receiver has been turned on.

Figures 2, 4:
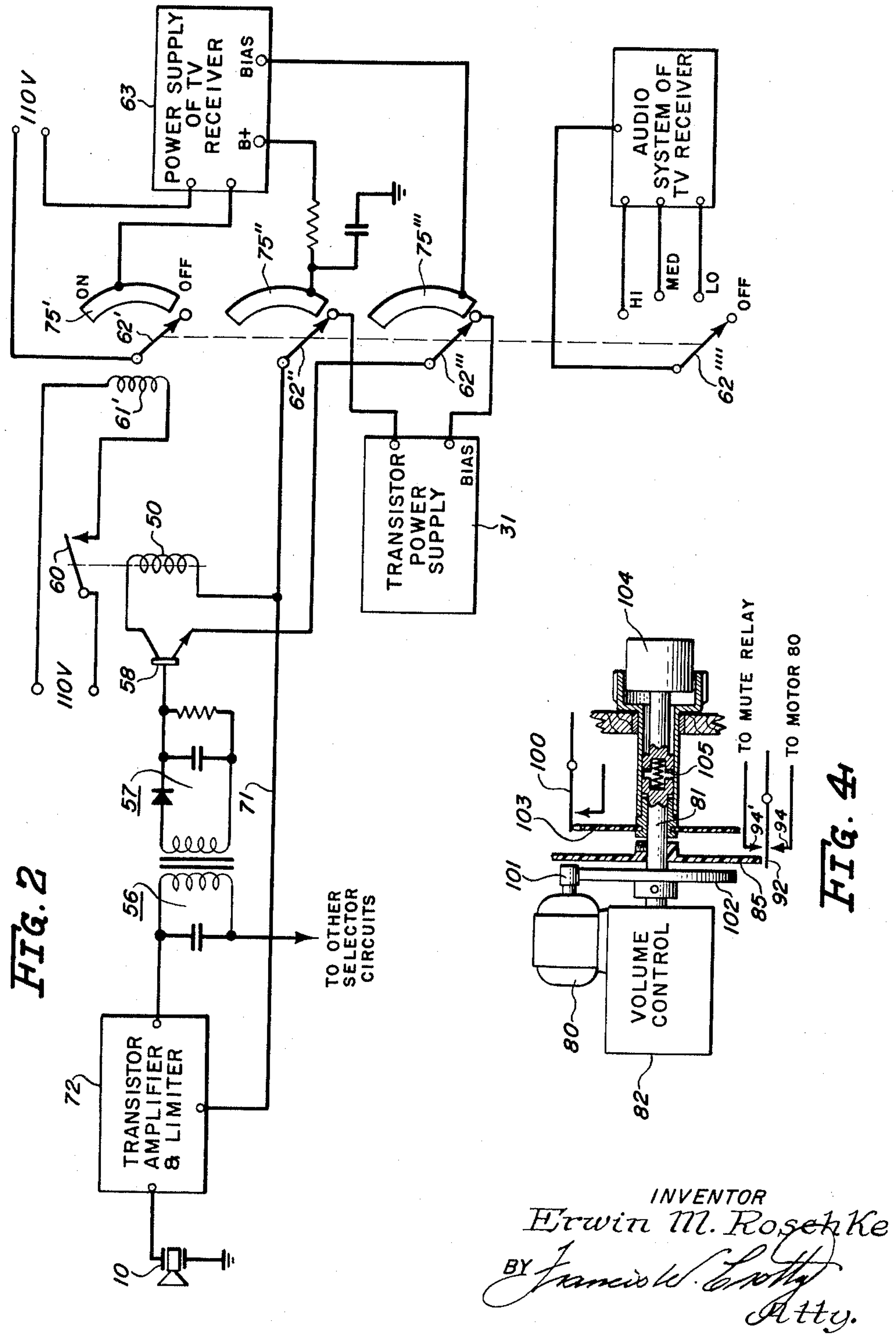
FIGURE 2 is a modification of the chassis power supply of the arrangement of FIGURE 1.
FIGURE 4 represents a detail of the arrangement of FIGURE 3, while FIGURES 5 and 6 concern still other embodiments of the invention.

The modification of FIGURE 2 differs from that of FIGURE 1 in that when the television receiver has been turned on, the transistor power supply 31 of the control chassis is disable and the control chassis derives all of its power from the controlled receiver. For such an embodiment, the power supply 31 may be simply a battery normally connected through a switch armature 62'' to a bus 71 which supplies potentials to the transistor amplifier and limiter shown in block diagram and designated 72. A bias from supply 31 is also applied through a movable switch armature 62''' to the emitter of amplifier 58, the collector thereof being returned to bus 71.

Relay 50 is the simple type which holds its armature 60 in its closed position only for the duration of the actuating signal while relay 61' is of the stepping type having four positions designated off, low, medium and high with respect to its armature 62''''. As the relay is successively energized, its armature 62'''' cycles or engages these four contacts in a repeating sequence. Armatures 62', 62'' and 62''' are ganged with armature 62'''' being movable from the position shown to engage elongated continuous contacts 75', 75'' and 75''' respectively.

In the operation of the modification of FIGURE 2, quiescent conditions of the system find armatures 62', 62'', 62''' and 62'''' in engagement with the contacts represented in the drawing. This causes amplifier 72 and the rest of the signal-translating channel through transistor 58 to be energized from power supply 31 of the control chassis. Upon receipt of the first command signal of a frequency to which selector 56 is tuned, relay 50 is energized and attracts its armature 60 to energize relay 61' and step its armatures one position. This connects power supply 63 of the television receiver to a 110 volt A.C. input via armature 62' and contact 75' but concurrently disables power supply 31 of the control chassis, transferring the power requirements of the chassis from power supply 31 to power supply 63 of the receiver. To effect this exchange, armatures 62'' and 62''' are moved into engagement with contacts 75'' and 75''' concurrently with the stepping of armature 62'. At the same time armature 62'''' engages the "low" contact which establishes minimum volume in the audio system of the controlled receiver. The next two actuations of relay 50 step armature 62'''' successively from its low to its medium and finally to its high volume positions. These three steps (low, medium and high) represent different levels of volume in the audio system of the controlled receiver and at each such step armatures 62', 62'' and 62''' engage contacts 75', 75'' and 75''' respectively. In other words, the receiver power supply is enabled when switch 62'''' is in engagement with any of the three steps low, medium and high and the circuitry of the audio system (not shown) is modified in known fashion so that the volume is adjusted in steps by operation of stepping relay 61'. After relay 61' has been actuated to advance armature 62'''' to its high position, the stepping sequence has been completed and the next command signal received restores the conditions depicted in FIGURE 2; receiver supply 63 and the receiver audio system are turned off but battery supply 31 is reconnected to energize limiter 72 and amplifier 58.

Figure 3:
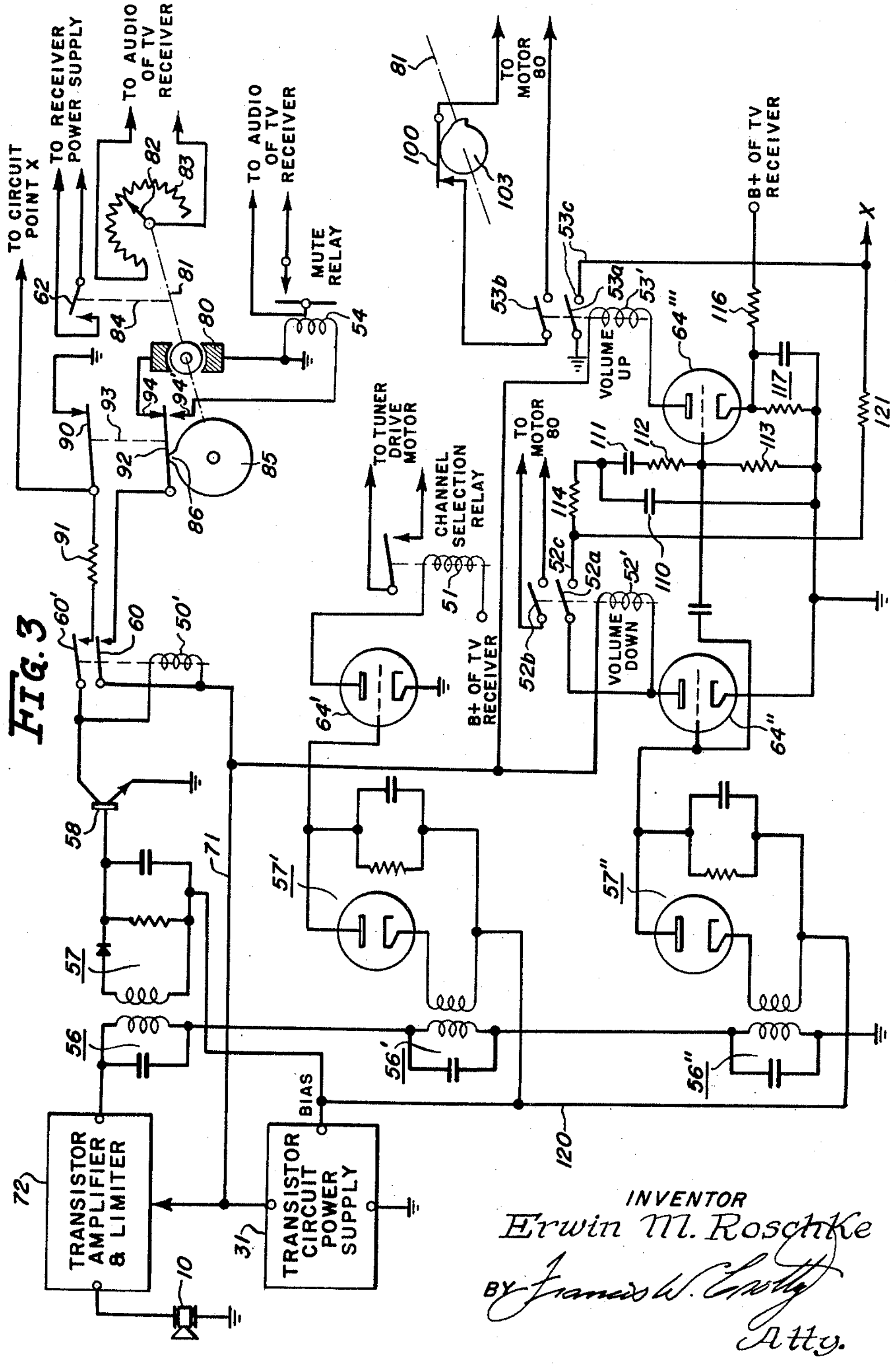
FIGURE 3 is a schematic representation of a further remote control system in which the control chassis power supply and control relay circuitry include features of the present invention.

The embodiment of FIGURE 3 is similar to that of FIGURE 1 in that at least some of the primary control relays of the chassis, other than relay 50', derive energizing potential from the power supply (not shown) of the controlled receiver. In this arrangement, however, there is the added feature of a continuously adjustable volume control plus the assignment of a single command frequency to both turning the controlled receiver on and off and effecting control of another function thereof such as muting.

To attain a continuous adjustment of volume, the receiver is provided with a motor-driven continuously adjustable element which serves as the power on/off switch and as a volume control. The motor is designated 80 and its shaft 81 is mechanically coupled to a switch arm or rotatable contact 82 of a volume control rheostat 83. For convenience of illustration, movable switch element 62 of the receiver power supply input is indicated, by broken-line connection 84, as mechanically coupled to and operated from shaft 81 as it is driven by motor 80. Actually, the motor shaft may carry a cam disc having a cam projection that may conveniently be employed to actuate switch 62 for energizing the power supply. Disc 85 provided with cam projection 86 may perform this function in which case when the motor and cam are in the position illustrated, projection 86 holds switch 62 open but, as soon as the cam rotates slightly, projection 86 permits switch 62 to close the power supply of the television receiver.

The control circuit which is completed when primary control relay 50' is first energized may be traced from potential bus 71, through armature 60 which is now closed, and through a movable contact 92 which cam 86 is holding against fixed contact 94 to the field or energizing circuit of motor 80. In other words, if conditions are as represented in FIGURE 3 with switch 62 in its open or off position, the control circuit completed by actuation of primary control relay 50' energizes driving motor 80 to operate switch 62 and turn the receiver on. It may be desirable to close a hold circuit to make certain that motor 80 is energized long enough to effect the desired rotation of cam disc 85 since relay 50' is of the type which maintains its armature 60 closed only for the duration of the command signal which has resulted in energization of the relay. Accordingly, the relay has a second armature 60' which, when the relay operates, may close a circuit from ground through a movable switch contact 90, a resistor 91, armature 60' and the coil of relay 50' to potential bus 71. This is a hold circuit which maintains relay 50' energized even though the command signal may be of very short duration, keeping motor 80 energized until cam projection 86 shall have cleared from engagement with movable contact 92. This contact is ganged with movable contact 90, as indicated by broken construction line 93, so that they operate together. When permitted to move, because of the rotation of cam 85, they open the hold circuit at switch element 90 and transfer the controlled circuit return of relay 50′ from motor 80 to mute relay 54 by breaking at contact 94 and making at contact 94′.

In other words, during on conditions of the volume control switch, when cam projection 86 shall have passed beyond armature 92, the control circuit associated with relay 50′ is modified so that operation of relay 50′ results in energization of a second control relay namely, mute relay 54 which is of the bi-stable type. This is accomplished by displacing movable switch 92 into engagement with its alternate contact 94′.

Accordingly control relay 50′, during intervals in which the on/off switch and volume control is off, permits a received command signal of a given frequency to energize motor 80 and turn the receiver on. During alternate operating intervals, after the receiver has been turned on, command signals of the same frequency control relay 54 and muting of the receiver.

Continuous volume control adjustments may be accomplished by additional relays included in energizing circuits of motor 80. More particularly, relay 52′ is here employed to decrease volume while relay 53′ increases volume. Relay 52′ has two armatures 52*a* and 52*b* which are displaced together as this bi-stable relay is actuated between its two operating conditions. Armature 52*b* is included in a circuit, shown only partially, which causes rotation of motor 80 in one direction so to drive contact 82 as to increase the effective resistance of rheostat 83 and decrease the level of volume of the receiver. Relay 53′ has a similar arrangement of movable contacts of which contact 53*b* is included in another energizing circuit for the motor, again only partially shown, to effect displacement of rheostat contact 82 in its opposite sense and increase the level of volume of the controlled receiver.

It may be desirable to establish a limit or maximum volume condition for the receiver and to that end a limit switch 100 is included in the motor circuit that is otherwise completed through relay contact 53*b*. Limit switch 100 is normally closed but is open when volume-control shaft 81 has attained a predetermined angular position. This may be more readily understood by reference to FIGURE 4 which shows a mechanical driving connection between motor 80 and volume control 82 provided through suitable reduction gears 101 and 102 so that shaft 81 is driven at a relatively low speed. Cam 103 may be adjustably supported on shaft 81 so that a cam projection carried on the periphery thereof may engage the displaceable contact switch 100 and break the motor circuit when shaft 81 shall have been driven to a preselected position. In order that this position may be readily adjustable, cam 103 is secured to the shaft through a set screw, friction or other arrangement which permits its angular adjustment relative to the shaft.

FIGURE 4 also shows the mounting of the other cam disc 85 which controls displacement of switch contact 92 and its selective engagement with stationary contacts 94 and 94′. Companion switch 90 which moves with switch 92 does not appear in this view.

A further feature of the volume adjustment is also indicated in this same figure where a manually adjustable control knob 104 is positioned in coaxial alignment with shaft 81. A spring 105 urges the components apart so that cooperating clutching surfaces which are provided on their facing ends are normally free of one another. This permits manipulation of knob 104 to complete a coupling connection through the shaft to the volume control so that the user may manually adjust the volume to suit even though the control chassis is equipped for remote and continuous adjustment for volume between minimum and maximum levels.

Returning to a further consideration of control relays 52′ and 53′, it will be apparent that the input electrodes of their preceding amplifiers 64″ and 64‴ are connected in parallel to rectifier 57″. Obviously, then, command signals of the frequency to which this rectifier responds are applied to the inputs of both tubes coincidently. A provision must be made to permit one or the other of the relays to respond. This is accomplished by requiring that a pair of command signals of the right frequency and of a minimum time separation be received to cause amplifier 64‴ to conduct and actuate relay 53′.

The input circuit of amplifier 64‴ includes an integrating condenser 110 across which are connected a differentiating network comprised of a capacitor 111 and resistances 112 and 113. The junction of these resistors is connected to the control electrode of tube 64‴. Integrating condenser 110 may be charged through a resistor 114 and armature 52*a* of control relay 52′ when the armature closes against contact 52*c* to complete a circuit through the relay winding to potential bus 71. There is a heavy cathode bias on tube 64‴ so that the threshold level required to start conduction in the tube is higher than that which can result from a single step charge of condenser 110. This bias is obtained through a resistor 116 which connects at one end to the power supply of the controlled receiver and at the other side to a resistive-capacitive cathode biasing circuit 117.

Amplifier 64″ is normally biased to cut-off from the bias supply of the chassis power supply circuit 31. This bias is delivered over a bus 120 and the load circuit of rectifier 57″. A similar bias arrangement maintains amplifier 64′ normally non-conductive. The anode circuit of this last-mentioned amplifier includes channel-selection relay 51 which, for the case under consideration, effects channel selection by driving the tuner in a single direction. Of course, two channel selection relays, individually responsive to a different command frequency, may be employed to achieve bi-directional drive of the tuner in the manner of FIGURE 1 if the that should be desired.

There are means provided which, in response to the adjustment of the volume control on/off switch from its on to its off conditions, establish volume down relay 52′ into the operating position in which its armature 52*a* is out of engagement with contact 52*c*. This is a necessary precaution lest volume control motor 80 be energized through control relay 52′ immediately upon the set being turned on to turn the set off again. This will not occur if bi-stable relay 52′ is established in the described condition in which the motor circuit is opened at armature 52*b*. The desired result may be obtained through a mechanical reset which is driven from shaft 81 or through a normalizing circuit.

The normalizing circuit may be completed through movable contact 90 which is closed by cam 86 at the time the volume control switch reaches its off position. The normalizing circuit extends from armature 90 to the point designated X, through a resistor 121 to contact 52*c*. If armature 52*a* is in engagement with its associated fixed contact 52*c*, the normalizing circuit is continued through the winding of relay 52′ to bus 71. Energization of the relay, resulting in its actuation, moves the armature to its stable open-contact position and disrupts the normalizing circuit but only after the relay 52′ has been so established to the condition represented in FIGURE 3 to open contact 52*b*.

Relay 52′ is of the bi-stable type whereas relay 53′ is bi-stable only in respect of its armature 53*b*. As to armature 53*a*, the relay is of the simple type, that is, armature 53*a* closes against contact 53*c* only for the duration of the signal applied to the relay. One terminal of armature 53*a* is grounded and the other may close against contact 53*c* which connects via resistor 121 to contact 52*c*. This is another normalizing circuit for relay 52′ which is completed if armature 52*a* is in engagement with contact 52*c* when armature 53*a* closes against contact 53*c*.

In considering the operation of this modified remote control arrangement, it will be assumed initially that the chassis is in the condition represented in FIGURE 3.

The on/off switch is open as represented at movable contact 62, cam 86 has closed armatures 90 and 92 against their contacts as indicated and the several relays 50–54, inclusive, establish their armatures also as indicated. The television receiver is de-energized or turned off.

To operate the receiver, a command signal of the frequency to which detector 57 is tuned is transmitted from a remote point to energize relay 50′. In response, the relay closes armature 60 upon its associated contact, completing an energizing circuit for motor 80 to drive shaft 81 and the cam discs it carries. As cam 86 passes from its engagement with armature 92, the motor circuit breaks at contact 94 and the motor stops but at this time the receiver power supply will have been turned on through closure of switch 62. The necessary driving time has been assured by the hold circuit completed through contact 90 and armature 60′ which are closed against their stationary contacts until the on/off switch has achieved its on condition. At this juncture, the controlled circuit responsive to actuation of relay 50′ extends through contact 94′ to mute relay 54 so that subsequent energization of relay 50′ in response to received additional bursts of command signals of the frequency to which detector 57 responds permits selective muting of the controlled receiver.

Channel selection is effected upon receipt of command signals to which detector 57′ responds since this detector is coupled to channel selection relay 51.

Continuous adjustment of volume may be accomplished upon the receipt of command signals to which detector 57″ responds. Obviously, when the on/off switch is initially turned on, the receiver has its minimum sound level. The sound level may be increased by operating the volume up actuator of the hand-held transmitter. This preferably causes double actuation of one resonator in the transmitter, causing the transmitter to issue two time-spaced pulses of the frequency to which detector 57″ responds.

The first such pulse actuates volume down relay 52′ and tends to start motor 80 in a direction to turn the set off by closing armatures 52*b* and it also establishes a charge increment on capacitor 110 by closing armature 52*a* against 52*c*. However, the inertia or delay of the response of the motor in relation to the time separation of the two transmitted pulses is such that the second command signal of this same frequency will have been received before motor 80 can be put into operation. This second signal opens the motor circuit at bi-stable contact 52*b* and adds the second command signal to the potential level established on the input of amplifier 64‴ by capacitor 110 to overcome the amplitude delay bias and cause the amplifier to conduct. Accordingly, relay 53′ actuates and closes the motor circuit at armature 53*b* to energize the motor in the direction required to increase the volume level.

When the correct level has been attained, the volume up actuator of the transmitter is again operated to transmit a second double pulse at the command frequency to which detector 57″ responds. This opens the motor circuit at contact 53*b* and retains the desired sound level. Should the user neglect to send this second double command signal to the chassis, limit switch 100 opens when the maximum sound level has been reached.

The volume may be decreased by operating the volume down actuator in the transmitter and sending but a single pulse of the command frequency to its detector 57″. This operates relay 52′ alone and closes the motor circuit at contact 52*b* to reduce the level of sound. When the volume has been decreased to the desired level, the volume down actuator is operated once again which opens the motor circuit of contact 52*b*. Of course, if one desires to turn the set off, the volume down actuator of the transmitter is operated once to close the motor circuit at contact 52*b* and keep it closed until driving motor 80 restores cam 86 to its rest position represented in FIGURE 3. At this time contact 90 is again closed and the normalizing circuit is energized to place volume down relay 52 in the condition shown in FIGURE 3. In short, conditions will now have been restored to that shown in FIGURE 3.

Figures 5, 6:
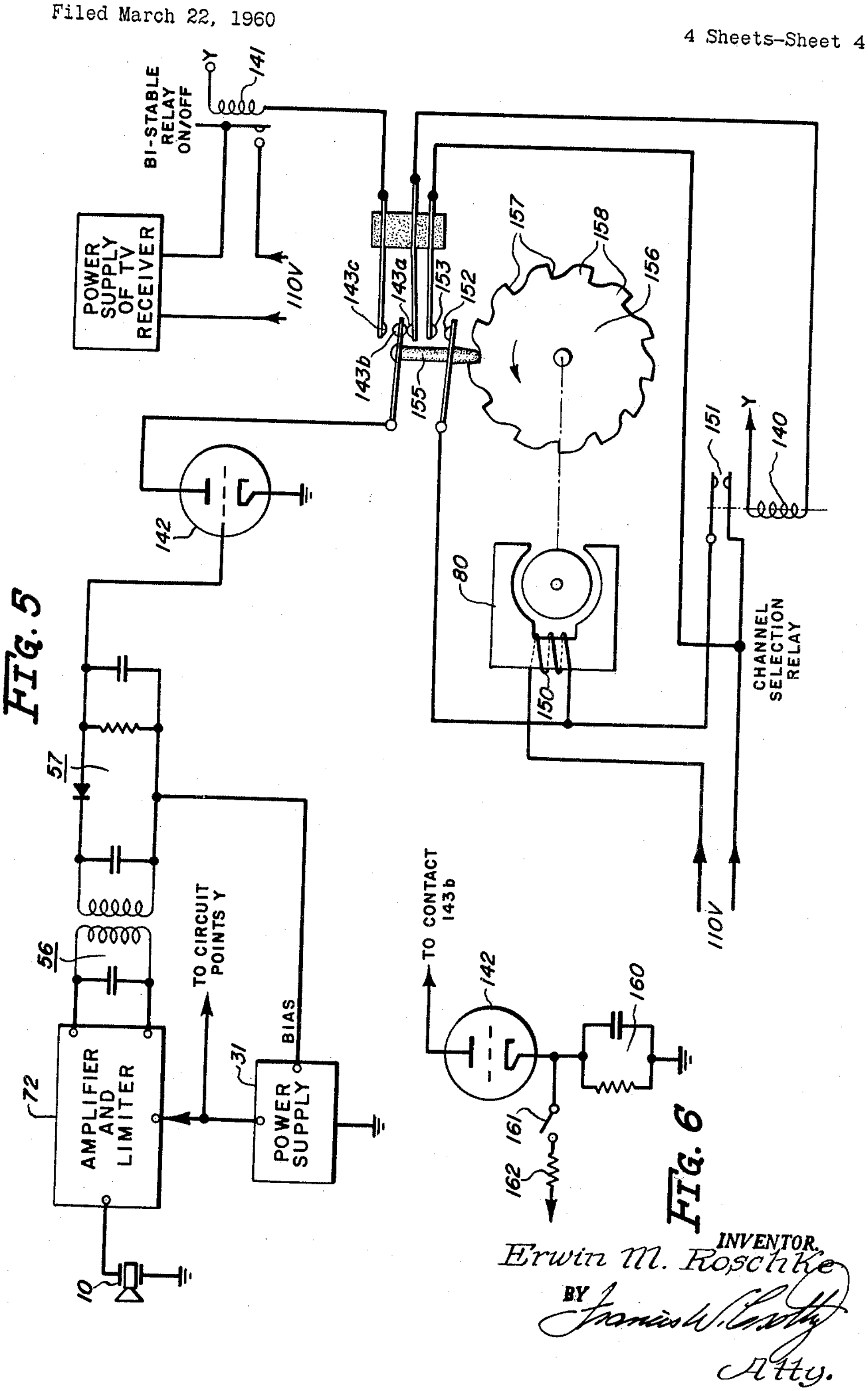

The modification of FIGURE 5 is similar to that of FIGURE 3 in that a single command frequency is relied upon to accomplish two functions in the controlled receiver; in particular, it is here relied upon to accomplish channel selection in a television receiver as well as operation of its on/off switch. Of course, the system could be arranged to have a series of frequency selective control devices responding to different ones of a family of control signals that may be separated on the basis of frequency to achieve numerous other functions of the controlled receiver but, as represented, it is a useful as well as economical simplified arrangement. It is shown as including a channel selection relay 140 and an on/off relay 141. Relay 140 is the simple type which attracts its armature only during the reception of an applied energizing signal but relay 141 is of the bi-stable type.

Relay 140 is normally coupled to the signal translating channel of the remote amplifier since it is included in the anode-cathode circuit of an amplifier 142 to which detected command signals are delivered from detector 57. Amplifier 142 is normally biased to its non-conductive state by means of a bias potential delivered from power supply 31 of the control chassis. The plate potential of the amplifier is supplied from the same source as shown by the legend "to circuit points Y" through which supply 31 connects to one terminal of relay 140 and from the other terminal of the relay winding to a normally closed contact pair 143*a*, 143*b*.

Relay 141 may likewise be connected to the signal channel of the remote amplifier through a circuit including a normally open switch 143*b*, 143*c*. Obviously, when movable switch element 143*b* closes against contact 143*c* the winding of relay 141 is connected in the anode circuit of amplifier 142.

There is an energizing circuit for motor 80 which drives the channel selector of the television receiver. This selector has not been shown for the reason that a turret type channel selector is well understood in the art and, of itself, constitutes no part of the present invention. The energizing circuit for motor 80 includes a field winding 150 which may be connected to a potential source designated 110 v. during intervals in which relay 140 is energized to close contact pair 151. It is recognized that the duration of the command signal may be shorter than the time required for motor 80 to step the channel selector from one of its operating positions to the next and for that reason a hold circuit is provided to assure that the motor is energized for the required period of time. The hold circuit will be completed through a movable contact 152 which may close against a fixed contact 153 after the motor has started the displacement of the channel selector. When these contacts close, winding 150 is connected directly across the 110 supply.

There is a switch operator 155 which is actuated during the time that the channel selector is stepping from one operating position to the next to close normally open switch contacts 143*b*, 143*c* as well as contacts 152, 153 of the hold circuit. This switch operator is in the nature of a cam follower which engages a cam disc 156. The cam disc has a series of recesses 157, 157. Between successive ones of these recesses the disc has raised cam sections 158, 158. Actually, this disc 156 may constitute an end plate of the turret tuner or it may be a simple multi-section cam disc as indicated in the drawing which is mechanically coupled to be driven with the channel selector and properly oriented so that its cam follower 155 rests in a recess 157 at the time the channel selector achieves any of its operating positions in which it is effective to select a television channel for utilization by the receiver.

In discussing the operation of this modification of the invention, it will be assumed initially that the television receiver has been turned off. Accordingly, the power supply of the receiver is de-energized because the switch controlled by on/off relay 141 is open. When it is desired to operate the receiver, the on/off switch is closed. While this may be accomplished from a remote point in a manner presently to be described, it is convenient to assume initially that the set has been turned on manually.

The channel-selection arrangement may now be operated from a remote point. Actuation of the remote transmitter to direct a command signal to microphone 10 results in a command being applied from detector 57 through amplifier 142 and normally closed contacts 143*a*, 143*b* to channel selection relay 140. This actuates the relay and closes normally open contact pair 151. As this contact pair closes, motor 80 is energized and starts to drive the channel selector and cam disc 156 in the direction indicated by the arrow. As the cam disc is displaced, switch actuator 155 rides up a raised cam section closing movable contact 152 against stationary contact 153 and movable contact 143*b* against stationary contact 143*c*. Closure of contacts 152, 153 completes the hold circuit for the motor to make certain that the drive continues until the channel selector has advanced one full step. After this advance of the selector another recess 157 of disc 156 will have been presented to cam follower 155 which recedes thereinto and breaks the hold circuit at contacts 152, 153. In this fashion, channel selection may be accomplished on a step by step basis.

If one desires to turn the receiver off, advantage is taken of the fact that a finite time is required to step the channel selector from one operating position to the next. During this time, cam follower 155 traverses a raised section of cam disc 156 connecting on/off relay 141 to the signal channel of the remote amplifier by closing contacts 143*b* and 143*c*. Concurrently, it disconnets channel selection relay 140 from the remote amplifier by breaking its circuit at contact 143*a*. During the finite interval when bi-stable relay 141 is thus connected to the remote amplifier, the hand transmitter may be actuated again to transmit a second command to the receiver. This command actuates on/off relay 141 and opens the power supply of the receiver.

In many instances, the inertia of the motor and the usual homing devices employed with turret turners will cause the selector to continue its movement to its next operating position even though on/off relay 141 has been actuated. If that should not occur, however, no harm is done and as soon as the instrument is again turned on manually, motor 80 continues the drive of the channel selector until the next operating position is reached for the reason that the hold circuit will have been retained since contacts 152 and 153 remain closed upon one another until the next operating position of the selector is reached.

If the power supply for motor 80 is not disabled by turning the set off, the set may also be turned on remotely by operating the remote transmitter to emit two time spaced commands and occasion a second actuation of bi-stable on/off relay 141. The operation in this regard is precisely the same as that described above in effecting receiver shut off.

The arrangement of FIGURE 5 may, alternatively, achieve the on/off function on the basis of duration of the received command signals as distinguished from the requirement of two command signals just described. For example, one may employ a transmitter of such construction that when the channel selection function is to be accomplished, the transmitter emits a command of a known duration whereas to accomplish the on/off function the transmitter issues a command of much longer duration. The response of the receiver to the short duration pulse to which the channel selection function is assigned is precisely as previously described.

When the longer duration on/off pulse or command signal is received, it initially closes channel selection relay 140 and commences rotation of cam disc 156. At that juncture, displaceable contact 143*b* connects the on/off relay to the remote amplifier and disconnects channel selection relay 140. Since the command is of relatively long duration, the change takes place soon enough to cause actuation of on/off relay 141 and operation of the on/off switch of the controlled receiver.

For this operation to be attained, it is desirable to assign well defined limits of duration to the channel selection and on/off command signals. The channel selection signal should be only long enough to make certain that the hold circuit is completed. It should not last sufficiently long to connect on/off switch 141 to the remote amplifier within the duration of the channel selection pulse. The duration of the on/off command, however, must be long enough to assure that there is a substantial portion of the pulse received after contact 143*b* has closed against contact 143*c* to connect the on/off relay to the output circuit of amplifier 142.

Unless a precaution is taken, difficulty may be encountered by having the on/off command signal of too long a duration. It is apparent from the foregoing description that a very long command signal, one which endures over several stepping intervals of the channel selector, will cause cyclic displacement of movable contact 143*b* and possibly repeated actuation of on/off relay 141. There is the possibility, therefore, that the on/off operation may execute two or more steps if the on/off command is too long when, in fact, only one operation is usually desired. This may be avoided through a simple modification of the circuitry of amplifier 142 as shown in FIGURE 6.

The representation is only of so much of the amplifier circuit as includes a change over the circuitry of FIGURE 5. The cathode of the amplifier is returned to ground through a network 160 comprising the parallel combination of a resistor and a capacitor. This capacitor may be charged to develop an amplitude delay bias for the amplifier by closure of a switch 161 which connects cathode network 160 through a resistor 162 to power supply 31 of the remote amplifier. Switch 161 may be another movable contact of relay 141.

With this arrangement, switch 161 is closed each time on/off relay 141 is actuated and its closure causes the capacitor of network 160 to be charged rapidly to a level which assures that amplifier 142 remains cut off. The cut off time is controllable by choosing the resistor of network 160 to the end that the amplifier is disabled only for the desired precautionary interval. With this modification to the amplifier, multiple actuation of the on/off relay is avoided even in the presence of command signals of long duration. It protects against repeated operation of the on/off relay so that a command will, for the most part, turn the receiver on or off as desired and will not cycle it between those conditions.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A remote control system for a wave-signal receiver which has a power supply, a motor driven adjustable element serving as a power on/off switch and volume control and further has other adjustable elements for controlling different operating characteristics of said receiver, said control system comprising: a signal-translating channel including a transducer for receiving command signals originating at a remote point and an amplifier for amplifying said command signals; a first control relay coupled to said channel to be actuated by said command signals;

a control circuit which is completed in response to actuation of said first relay and which during off conditions of said switch energizes the driving motor of said switch to adjust said switch and to turn said receiver on; a power supply included in said control system for applying operating potentials to said channel and to said first control relay; at least one additional control relay also coupled to said channel to be actuated by said command signals, said additional relay being coupled to one of said adjustable elements of said receiver to adjust an operating characteristic thereof; and circuit connections extending from said receiver power supply to said additional control relay to apply operating potential thereto during on conditions of said switch.

2. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals; a second control relay for adjusting said other element; and a control circuit which is completed in response to actuation of said first relay and which during off conditions of said switch energizes the driving motor thereof to displace said element to turn said receiver on and which during on conditions of said switch energizes said second control relay.

3. A remote control system for a wave-signal receiver which has a motor-driven adjustable element serving as a power on/off switch and volume control and further has a mute relay, said control system comprising: a signal translating channel including a transducer for receiving command signals originated at a remote point and an amplifier for amplifying said command signals; a control relay coupled to said channel to be actuated by said command signals; and a control circuit which is completed in response to actuation of said control relay and which during off conditions of said switch energizes the driving motor thereof to displace said element to turn said receiver on and which during on conditions of said switch energizes said mute relay of said receiver.

4. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; and a third relay coupled to said channel to be actuated by command signals of another particular identification to energize the driving motor of said switch and effect volume control adjustments of said receiver.

5. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; and a third relay coupled to said channel to be actuated by command signals of another particular identification to energize the driving motor of said switch and effect volume control adjustments of said receiver only during on conditions of said switch.

6. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; and a third relay coupled to said channel to be actuated by command signals of another particular identification, said third relay being of the bi-stable type having one condition in which the driving motor of said switch is energized to effect continuous volume control adjustments of said receiver over a preselected range of adjustments and having another condition in which said driving motor is de-energized.

7. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; and third and fourth relays coupled to said channel to be actuated by command signals of other particular identifications, said third and fourth relays having one operating condition in which the driving motor of said switch is energized to effect increasing and decreasing volume control adjustments respectively in said receiver and having another operating condition in which said driving motor is de-energized.

8. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said motor-driven adjustable element to turn said receiver on and which during on conditions of said switch energizes said second control relay; a third relay coupled to said channel to be actuated by command signals of another particular identification, said third relay having one condition in which the driving motor of said switch is energized to increase the volume in said receiver and having another condition in which said driving motor is de-energized; and a limit switch responsive to the adjustment of said volume-control switch to a preselected maximum volume condition to in effect disable said third relay.

9. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; third and fourth relays coupled to said channel to be actuated by command signals of other particular identifications, said third and fourth relays having one operating condition in which the driving motor of said switch is energized to effect increasing and decreasing volume control adjustments respectively in said receiver and having another operating condition in which said driving motor is de-energized; and means responsive to the adjustment of said switch from its on to its off condition for establishing at least one of said third and fourth relays to its aforesaid other operating condition.

10. A remote control system for a wave-signal receiver which has a motor-driven adjustable element serving as a power on/off switch and volume control and further has another adjustable element for controlling an operating characteristic of said receiver, said control system comprising: a signal-translating channel including a transducer for receiving command signals originated at a remote point and an amplifier for amplifying said command signals; a first control relay coupled to said channel to be actuated by command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; third and fourth relays coupled to said channel to be actuated by command signals of other particular identifications, said third and fourth relays having one operating condition in which the driving motor of said switch is energized to effect decreasing and increasing volume control adjustments respectively in said receiver and having another operating condition in which said driving motor is de-energized; and a normalizing circuit which is completed as said switch is adjusted from said on to said off condition if said third relay is then in its aforesaid one operating condition to actuate such relay and establish it in its aforesaid other operating condition.

11. A remote control system for a wave-signal receiver which has two adjustable elements for controlling an operating characteristic of said receiver, said control system comprising: a signal-translating channel including a transducer for receiving command signals originated at a remote point and an amplifier for amplifying said command signals; a first control relay coupled to said channel to be actuated by pulse-modulated control signals and coupled to one of said adjustable elements to effect actuation thereof and control of said receiver; a second control relay likewise coupled to said channel to be actuated by pulse-modulated command signals and coupled to another of said elements to effect actuation thereof and control of said receiver; both of said relays having a first operating condition in which the adjustable element connected thereto is retained in a quiescent condition and having an alternate operating condition in which the adjustable element connected thereto is actuated, said second control relay having an integrating input circuit with a discharge time constant of predetermined value and an amplitude delay bias such that two bursts of command signal, received with a time separation less than said discharge time constant, are required to overcome said bias and actuate said second relay between its aforesaid two operating conditions; and a normalizing circuit, which is completed if said first relay is in its alternate condition at the time said second relay is actuated to its alternate position, for actuating said first relay to its first operating condition.

12. A remote control system for a wave-signal receiver which receiver has adjustable elements for varying operating characteristics thereof and a power supply for supplying operating potentials thereto, said control system comprising: a signal-translating channel including a transducer for receiving command signals originated at a remote point and an amplifier for amplifying said command signals; a first control device coupled to said channel to be actuated by said command signals and having a controlled element coupled to said power supply of said receiver selectively to enable and disable said power supply in response to said command signals; a power supply included in said control system for applying operating potentials to said channel and to said first control device; at least one additional control device also coupled to said channel and having a controlled element coupled to one of said adjustable elements of said receiver to adjust an operating characteristic of said receiver in response to said command signals; and circuit connections extending from said receiver power supply to said additional control device to apply operating potential thereto during intervals in which said first control device enables said receiver power supply.

13. A remote control system according to claim 12, which includes additional means responsive to the enabling of said receiver power supply for disabling said power supply of said control system and for applying operating potentials to said channel and to said first control device from said receiver power supply.

14. A remote control system for a wave-signal receiver which has a motor-driven adjustable element serving as a power on/off switch and bi-directional control device of an operating characteristic of said receiver and further has another adjustable element for controlling another operating characteristic of said receiver, said control system comprising: a signal-translating channel including a transducer for receiving command signals originated at a remote point and an amplifier for amplifying said command signals; a first control relay coupled to said channel to be actuated by said command signals of one particular identification; a second control relay for adjusting said other element; a control circuit which is completed in response to actuation of said first relay and which during off conditions of said switch energizes the driving motor thereof to displace said element to turn said receiver on and which during on conditions of said switch energizes said second control relay; and third and fourth relays coupled to said channel to be actuated by command signals of other particular identifications, said third and fourth relays having one operating condition in which the driving motor of said switch is energized to effect adjustment of said control device in respective opposite senses and having another operating condition in which said driving motor is de-energized.

15. A remote control system for a wave-signal receiver having first and second adjustable elements for respectively controlling two operating characteristics of said receiver, said control system comprising: a signal-translating channel including a transducer for receiving command signals originated at a remote point and an amplifier for amplifying said command signals; a first control relay coupled to said channel and actuated by said command signals for control of said first adjustable element; a control circuit which is completed in response to actuation of said first control relay to de-couple said first relay from said channel and to couple said second relay to said channel, said second relay being responsive to said command signals from said channel to control said second adjustable element.

16. A remote control system for a wave-signal receiver which has a bidirectional adjustable element for controlling an operating characteristic of said receiver, said control system comprising: a signal-translating channel including a transducer for receiving command signals originating at a remote point and an amplifier for amplifying said command signals; first and second control relays both coupled to said channel to be actuated by command signals, said first control relay having one operating condition in which said bidirectional adjustable element is actuated to effect adjustments of said receiver in one sense and said second relay having an operating condition in which said bidirectional adjustable element is actuated in its opposite sense, said second relay having an energizing circuit independent of said first relay for applying potentials thereto; and means including an integrating input circuit for said second relay with a discharge time constant of a predetermined value and a predetermined amplitude delay bias, and responsive to at least two bursts of command signals with a time separation less than said discharge time constant, for overcoming said bias and actuating said second relay.

17. A remote control system for a wave signal receiver for effecting two control functions of said receiver, said control system comprising: a signal-translating channel including a transducer for receiving command signals originated at a remote point and an amplifier for amplifying said command signals; a first control relay actuatable from a reference "off" condition to an operated condition in which a first one of said control functions is effected; a second control relay actuatable to an operated condition in which the other of said control functions is effected; means coupling said channel to said first relay and responsive to a single burst of said command signal for actuating said first relay from its reference condition to its operated condition; means, including an integrating input circuit with a predetermined time constant, coupling said channel to said second relay and responsive to a pair of command signal bursts with a time separation less than said time constant for actuating said second relay to its operated condition; means responsive to a pair of command signal bursts with a time separation less than said time constant for directly establishing said first relay in its reference "off" condition; and control means responsive to actuation of said first and second relays for selectively controlling each of said control functions independently of the other as determined by the reception of single and double command signals respectively.

18. In a burst-operated remote control system of the type comprising a control channel for selectively responding to control signal bursts of a predetermined frequency, a system for utilizing said control channel for selectively and independently performing either of a pair of control functions depending on reception of either a single control signal burst or a pair of such bursts of said predetermined frequency within a predetermined time interval comprising: means coupled to said control channel, including a control device with an integrating input circuit having a time constant corresponding to said predetermined time interval, for initiating one of said control functions in response to reception of a pair of control signal bursts within said predetermined time interval; means including a bistable relay adapted to initiate the other of said control functions in only one of its two stable operating conditions; and means coupled to said control channel for actuating said bistable relay from one of said stable operating conditions to the other in response to reception of each control signal burst.

References Cited by the Examiner

UNITED STATES PATENTS

| | | | |
|---|---|---|---|
| 2,297,618 | 9/42 | Grimes et al. | 325—391 |
| 2,357,237 | 8/44 | Thompson | 325—391 |
| 2,817,025 | 12/57 | Adler | 325—391 X |
| 2,943,146 | 6/60 | Thomas | 325—392 X |

DAVID G. REDINBAUGH, *Primary Examiner.*

SAMUEL B. PRITCHARD, *Examiner.*